United States Patent
Leandri

(10) Patent No.: US 10,853,426 B2
(45) Date of Patent: Dec. 1, 2020

(54) METHOD FOR SEARCHING FOR PAGES ACCESSIBLE OVER A NETWORK

(71) Applicant: QWANT, Paris (FR)

(72) Inventor: Eric Leandri, Paris (FR)

(73) Assignee: QWANT, Paris (FR)

( * ) Notice: Subject to any disclaimer, the term of this patent is extended or adjusted under 35 U.S.C. 154(b) by 110 days.

(21) Appl. No.: 15/567,856

(22) PCT Filed: Apr. 20, 2016

(86) PCT No.: PCT/FR2016/050921
§ 371 (c)(1),
(2) Date: Oct. 19, 2017

(87) PCT Pub. No.: WO2016/170269
PCT Pub. Date: Oct. 27, 2016

(65) Prior Publication Data
US 2018/0089321 A1    Mar. 29, 2018

(30) Foreign Application Priority Data

Apr. 20, 2015  (FR) ..................... 15 53508
Apr. 20, 2015  (FR) ..................... 15 53514

(51) Int. Cl.
*G06F 16/9535* (2019.01)
*G06F 16/9038* (2019.01)
*G06F 16/951* (2019.01)
*G06F 16/332* (2019.01)

(52) U.S. Cl.
CPC ...... *G06F 16/9535* (2019.01); *G06F 16/3322* (2019.01); *G06F 16/3326* (2019.01); *G06F 16/9038* (2019.01); *G06F 16/951* (2019.01)

(58) Field of Classification Search
None
See application file for complete search history.

(56) References Cited

U.S. PATENT DOCUMENTS 7,617,184 B2 *  11/2009  Ferrari .................. G06F 16/954
8,209,314 B2 *   6/2012  Blackwell ............. G06F 16/951
                                                  707/706

(Continued)

*Primary Examiner* — Kim T Nguyen
(74) *Attorney, Agent, or Firm* — Patshegen IP LLC; Moshe Pinchas

(57) ABSTRACT

The invention relates to a method for searching for pages via relevance feedback of information extracted from a set of search results comprising:
 a first step of searching for resources, in a first database, on the basis of at least one entered keyword,
 a first step of displaying, in a second portion of the displayed page, the results of the first search step,
and at least one iteration of:
 a step of determining filters on the basis of keywords associated, in a second database, with the displayed resources,
 a second step of displaying, in a third portion of the displayed page, information representative of each determined filter,
 a step of selecting, by a user, at least one filter from the displayed filters,
 a second step of searching for resources, in the first database of the network, on the basis of at least one entered keyword and each selected filter and
 a third step of displaying, in the second portion of the displayed page, the results of the second search.

9 Claims, 4 Drawing Sheets

(56) References Cited

U.S. PATENT DOCUMENTS

| | | | | |
|---|---|---|---|---|
| 8,326,847 B2* | 12/2012 | Balmin | ............... | G06F 16/2425 |
| | | | | 707/754 |
| 8,463,764 B2* | 6/2013 | Fujioka | ............... | G06F 16/9535 |
| | | | | 707/706 |
| 8,938,438 B2* | 1/2015 | Nijjer | ................ | G06F 16/24578 |
| | | | | 707/706 |
| 2002/0051020 A1* | 5/2002 | Ferrari | .................. | G06F 16/954 |
| | | | | 715/854 |
| 2013/0232006 A1* | 9/2013 | Holcomb | .............. | G06F 16/951 |
| | | | | 705/14.54 |
| 2015/0026150 A1* | 1/2015 | Kim | ...................... | G06F 16/335 |
| | | | | 707/706 |

* cited by examiner

METHOD FOR SEARCHING FOR PAGES ACCESSIBLE OVER A NETWORK

TECHNICAL FIELD OF THE INVENTION

The present invention relates to a method for searching for pages accessible over a network. It applies, in particular, to the optimization of searches carried out on a search engine searching for resources over a network.

STATE OF THE ART

The accessibility and intelligibility of information have become major technical problems now that this information is available on computer networks such as the Internet comprising hundreds of millions of sites and billions of pages.

In particular, content searches based on keywords entered by a user on a search engine present a great spread of results when these keywords are:
- acronyms;
- generic terms;
- polysemic words as a function, in particular, of the context of use.

In these cases, the search results proposed to the user are not very usable and generally require one or more keywords to be added to the keywords initially entered to refine this search.

These additions of keywords lead to displays of additional pages, which overloads the network and causes a wastage of electrical energy.

SUBJECT OF THE INVENTION

The present invention aims to remedy all or part of these drawbacks.

To this end, according to a first aspect, the present invention envisages a method for searching for pages accessible over a network, which comprises:
- a step of entering at least one keyword in an input area displayed in a first portion of a page;
- a first step of searching for resources, in a first database of the network, on the basis of at least one entered keyword;
- a first step of displaying, in a second portion of the displayed page, the results of the first search step;

and at least one iteration of:
- a step of determining filters on the basis of keywords associated, in a second database, with the displayed resources;
- a second step of displaying, in a third portion of the displayed page, information representative of each determined filter;
- a step of selecting, by a user, at least one filter from the displayed filters;
- a second step of searching for resources, in the first database of the network, on the basis of at least one entered keyword and each selected filter; and
- a third step of displaying, in the second portion of the displayed page, the results of the second search.

Thanks to these provisions, the determination of filters makes it possible to distribute the results of the search into different contexts. The selection of one of these filters by a user makes it possible to refine the subject of the search carried out. For example, the keywords "Victor Hugo" make it possible to determine the filters "Address", "Literature" and "Hotels" corresponding to different plausible search contexts for these keywords. In this way, the second search step makes it possible to refine this search context.

In some embodiments, a mark associated with each displayed result is displayed in the second portion of the displayed page, the step of selecting at least one filter being carried out by a user selecting at least one mark.

These embodiments enable a user to select a mark opposite a result close to the desired search result. The selection of this mark corresponds to an implicit selection of at least one determined filter.

In some embodiments, the method that is the subject of the present invention comprises the third step of displaying, in the third portion of the displayed page, results from the second search, in which at least one filter was selected by a user selecting a mark.

These embodiments enable a user to change, at any time, the selection of a mark displayed at the end of the first search step in order to perform a second search step carried out on the basis of the mark newly selected.

In some embodiments, a mark associated with each displayed result is displayed in the second portion of the displayed page, the step of determining at least one filter being carried out on the basis of at least one mark selected by a user.

These embodiments make it possible to determine filters close to the context of each result for which the associated mark has been selected.

In some embodiments, a filter is determined on the basis of a keyword when at least two resources are associated with said keyword.

These embodiments make it possible to ignore single resources in determining filters.

In some embodiments, at least one item of information representative of a determined filter is a string of characters representative of at least one keyword utilized to determine said filter.

These embodiments enable a simple display of said filter relative to an embodiment utilizing an image, for example.

In some embodiments, the method that is the subject of the present invention comprises, before the search step, a step of selecting a first filter, from a list of predetermined first filters, each search step being performed on the basis of at least one entered keyword and the selected first filter.

These embodiments enable a result category to be selected, this category not being dependent on the results of the first search and aimed at refining the context of the search beforehand.

The present invention envisages, according to a second aspect, a method for searching for pages accessible over a network, which comprises:
- a step of entering at least one keyword in an input area displayed in a first portion of a page;
- a first step of searching for resources, in a first database of the network, on the basis of at least one entered keyword;
- a first step of displaying, in a second portion of the displayed page, each result of the first search step and a mark associated with each result;

and at least one iteration of:
- a step of selecting at least one mark;
- a step of determining search filters, from a second database, on the basis of the mark selected;
- a second step of displaying, in a third portion of the displayed page, information representative of each determined filter;
- a step of selecting, by a user, at least one filter from the displayed filters;

a second step of searching for resources, in the first database of the network, on the basis of at least one entered keyword and each selected filter; and a third step of displaying, in the second portion of the displayed page, the results of the second search.

In some embodiments, at least one item of information representative of a determined filter is a string of characters representative of at least one keyword utilized to determine said filter.

In some embodiments, the method that is the subject of the present invention comprises, before the search step, a step of selecting a first filter, from a list of predetermined first filters, each search step being performed on the basis of at least one entered keyword and the selected first filter.

In some embodiments, the list of predetermined first filters is displayed in a fifth portion of the page, the step of selecting a first filter being performed by a user selecting an item of information representative of said first filter in the list displayed.

The advantages, aims and characteristics of the method that is the subject of the second aspect of the present invention being similar to those of the method that is the subject of the first aspect of the present invention, they are not repeated here.

According to a third aspect, the present invention envisages a method for searching for pages accessible over a network, which comprises:

a step of entering at least one keyword in an input area displayed in a first portion of a page;

a first step of searching for resources, in a first database of the network, on the basis of at least one entered keyword;

a first step of displaying, in a second portion of the displayed page, each result of the first search step and a mark associated with each result;

and at least one iteration of:

a step of selecting at least one mark;

a step of determining search filters, from a second database, on the basis of the mark selected;

a second step of displaying, in a third portion of the displayed page, information representative of each determined filter;

a step of selecting, by a user, at least one filter from the displayed filters;

a second step of searching for resources, in the first database of the network, on the basis of at least one entered keyword and each selected filter; and a third step of displaying, in the second portion of the displayed page, the results of the second search.

In some embodiments, the method that is the subject of the present invention comprises, before the search step, a step of selecting a first filter, from a list of predetermined first filters, each search step being performed on the basis of at least one entered keyword and the selected first filter.

These embodiments enable a result category to be selected, this category not being dependent on the results of the first search and aimed at refining the context of the search beforehand.

In some embodiments, the list of predetermined first filters is displayed in a fifth portion of the page, the step of selecting a first filter being performed by a user selecting an item of information representative of said first filter in the list displayed.

Thanks to these provisions, the determination of filters makes it possible to distribute the results of the search into different contexts. The selection of one of these filters by a user makes it possible to refine the subject of the search carried out. For example, the keywords "Victor Hugo" make it possible to determine the filters "Address", "Literature" and "Hotels" corresponding to different plausible search contexts for these keywords. In this way, the second search step makes it possible to refine this search context.

BRIEF DESCRIPTION OF THE FIGURES

Other advantages, aims and particular features of the invention will become apparent from the non-limiting description that follows of at least one particular embodiment of the method that is the subject of the present invention, with reference to drawings included in an appendix, wherein.

DESCRIPTION OF EXAMPLES OF REALIZATION OF THE INVENTION

The present description is given as a non-limiting example, each characteristic of an embodiment being able to be combined with any other characteristic of any other embodiment in an advantageous way. In addition, each parameter of an example of realization can be utilized independently from the other parameters of said example of realization.

"Networked terminal" means a device comprising at least a screen and a means of communication with a data network. This data network is, for example, a mobile data network, or an internet or intranet network. The communication means utilizes, for example, wired technology, such as an Ethernet cable, or wireless technology, such as the protocols of the IEEE 802.11 standard, known as "Wi-Fi", or a 3G or 4G type of mobile network. Such a networked terminal is, for example:

a computer;

a digital tablet; or a smartphone.

It is now noted that the figures are not to scale.

Figure 1:
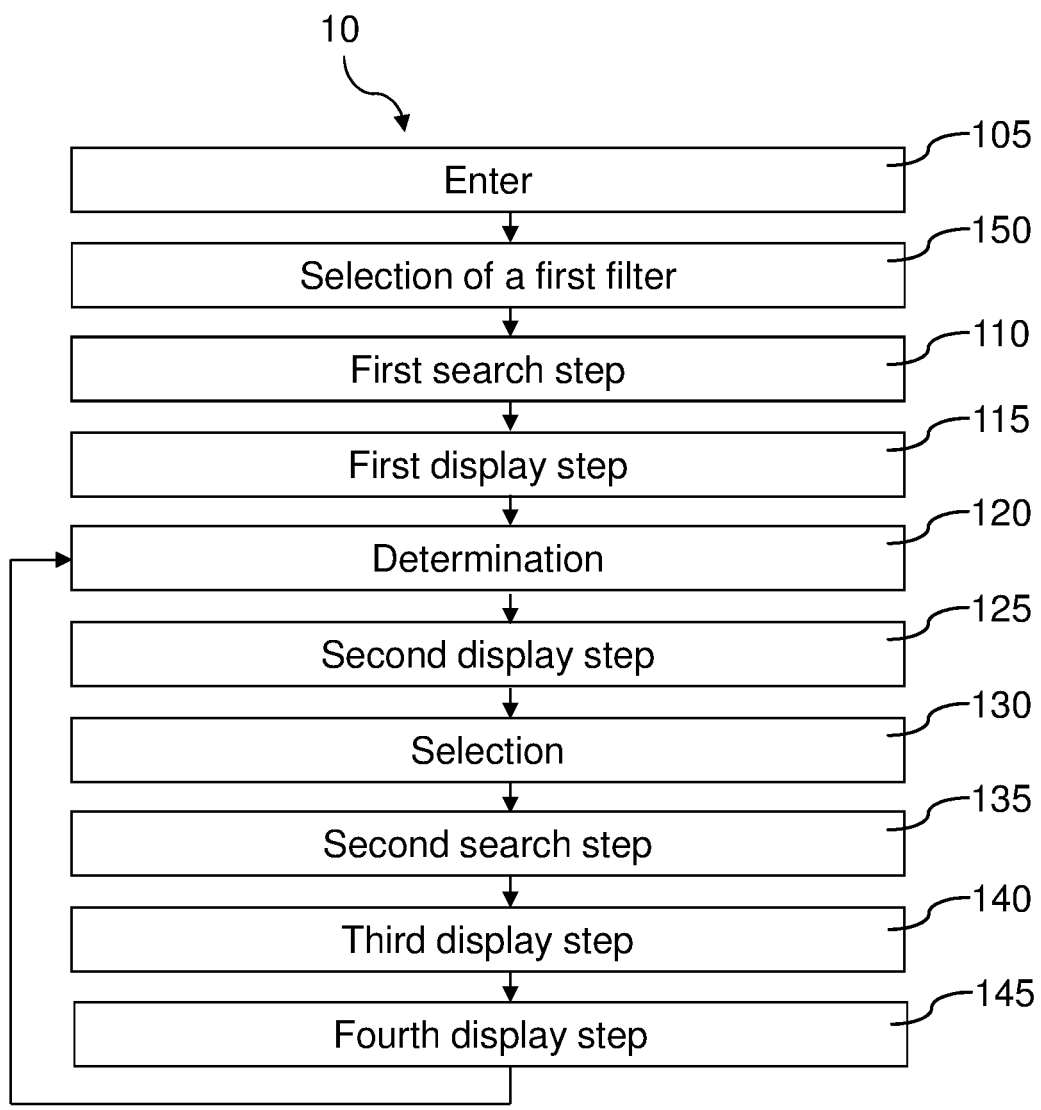
FIG. 1 represents, schematically, a first logical diagram of particular steps of the method that is the subject of the present invention.

FIG. 1 shows a logical diagram of particular steps of the method 10 that is the subject of the present invention. This method 10 for searching for pages accessible over a network comprises:

a step 105 of entering at least one keyword in an input area displayed in a first portion of a page;

a first step 110 of searching for resources, in a first database, on the basis of at least one entered keyword;

a first step 115 of displaying, in a second portion of the displayed page, the results of the first search step;

and at least one iteration of:

a step 120 of determining filters on the basis of keywords associated, in a second database, with the displayed resources;

a second step 125 of displaying, in a third portion of the displayed page, information representative of each determined filter;

a step 130 of selecting, by a user, at least one filter from the displayed filters;

a second step 135 of searching for resources, in the first database of the network, on the basis of at least one entered keyword and each selected filter; and a third step 140 of displaying, in the second portion of the displayed page, the results of the second search.

When a user wants to carry out a search for resources, such as a website for example, this user utilizes a search engine. This search engine, normally hosted on a local or remote computer server, is accessed by means of a networked terminal.

The interface of the search engine that the user accesses by means of the networked terminal comprises an area for entering keywords to be used for carrying out the search.

The entry step 105 is performed, for example, by utilizing a man-machine interface such as a keyboard, a unit consisting of a mouse and a virtual keyboard, or a unit consisting of a microphone and a speech recognition system of the networked terminal. Irrespective of the interface chosen, the input signal is converted into a string of characters displayed in the search engine. This character string consists of one or more keywords separated, or not, by spaces. These keywords, one recognized by the search engine, make it possible to carry out the search on the basis of said keywords.

This recognition step can be supplemented by a step to automatically correct an entry error.

For example, a user enters the terms "Victor Hugo" in the input area to find out about the author's biography.

The first search step 110 is carried out, for example, by utilizing a calculation unit of the computer server filtering available resources in a database on the basis of each keyword entered by the user. The search results are then sorted by relevance as a function, for example, of the number of hyperlinks to each result, such that the relevance is equivalent to the popularity measured in this way.

The first display step 115 is carried out, for example, by a circuit controlling the screen of the networked terminal configured to control the display, in the second portion of the page, of the results from the search. Preferably, this display highlights the results considered to be the most relevant. This display is carried out, for example, in the form of a list of hyperlinks to the address of each result displayed.

For example, the search for "Victor Hugo" returns a plurality of results—geographic, literary and/or historical.

The determination step 120 is carried out, for example, by a calculation unit of the computer server configured to detect a set of keywords associated with each result of the search. These keywords are stored in the second database with respect to an item of information representative of each resource of the first database.

These keywords are, for example, entered automatically into the second database according to the frequency of keywords detected in the content of the result. These keywords can also be manually entered or corrected in the second database.

The second display step 125 is carried out, for example, by the circuit controlling the screen of the networked terminal configured to control the display, in the third portion of the page, of the filters determined. Preferably, this display highlights the filters considered to be the most relevant. A filter's relevance is determined as a function of the number of results from the first search that led to the determination of said filter. This display is, for example, in the form of a list of buttons positioned on the left of the second portion of the displayed page.

For example, the search for "Victor Hugo" leads to the determination and display of the filters:

"literature";

"life of the author";

"hotel in Paris"; and

"address".

The selection step 130 is carried out, for example, by utilizing a man-machine interface such as a mouse, for example. During this step 130, the user selects a filter by clicking on a graphic object representative of this filter, such as a button for example.

For example, the user clicks on a button representative of the "life of the author" filter mentioned above.

The second search step 135 is carried out, for example, in the same way as the first search step 110 on the basis, in addition to the keywords entered by the user, of each filter selected.

The third display step 140 is carried out, for example, by the circuit controlling the screen of the networked terminal configured to control the display, in the fourth portion of the page, of the results from the second search. Preferably, this display highlights the results considered to be the most relevant. This display is, for example, in the form of a list of hyperlinks positioned on the right of the second portion of the displayed page.

For example, the results of the second search based on the terms "Victor Hugo" and the filter "life of the author" lead to hyperlinks to website pages with biographies of the author being displayed.

Therefore, a new determination step 120 can be carried out to refine the results of the search carried out. In the above example, new filters determined are, for example:

"the author's youth";

"literary recognition"; and

"heritage".

During this new determination step 120, the filters determined during each preceding iteration of this step 120 are ignored, so as to differentiate the results from the second search step 135.

In some preferred embodiments, a mark associated with each displayed result is displayed in the second portion of the displayed page, the step 130 of selecting at least one filter being carried out by a user selecting at least one mark.

Each mark is displayed, for example, on the right of each displayed result. This mark is, for example, an arrow pointing outside the second portion of the page. Preferably, this arrow points to the edge of the second portion of the closest page.

During the selection step 130, a user clicks on a mark, each mark corresponding at least to one filter determined during the determination step 120. In this way, the user just has to click on a mark close to a result of interest, the second search step 135 returning results close to this initial result of interest unless the user selects a filter roughly, ie without seeing what type of results this filter corresponds to.

In some embodiments, as represented with regard to FIG. 1, the method 10 comprises the third step 145 of displaying, in the third portion of the displayed page, results from the second search, in which at least one filter was selected by a user selecting a mark. This fourth display step 145 can be carried out instead of the third display step 140.

In some embodiments, a mark associated with each displayed result is displayed in the second portion of the displayed page, the step 120 of determining at least one filter being carried out on the basis of at least one mark selected by a user.

In these embodiments, a user's selection of a mark has an influence on the determination 120 of filters. This selection acts, for example, as a predetermination of at least one filter, the determination step 120 determining filters close to the filter determined by selecting the mark.

For example, a user having searched for "Victor Hugo" and selected a mark opposite a result dealing with the author's biography can lead to the determination and display of the filters:
- "the author's youth";
- "literary recognition"; and
- "heritage"

provided a second search step 135 is not carried out.

In some embodiments, a filter is determined on the basis of a keyword when at least two resources are associated with said keyword. In this way, no filter differentiating all the results from the first search 110 except one is determined.

In some embodiments, as shown in FIG. 1, the method 10 comprises, before the search step 110, a step 150 of selecting a first filter, from a list of predetermined first filters, each search step 110 or 135 being performed on the basis of at least one entered keyword and the selected first filter.

These first filters represent, for example, categories of results independent of the filters determined during the determination step 120. Such first filters make it possible to sort the results from the first search on the basis of search categories searched for by the user. For example, if a user is looking for a result containing commercial offers, the results obtained from the first search step that are not commercial offers are disregarded.

Figure 2:
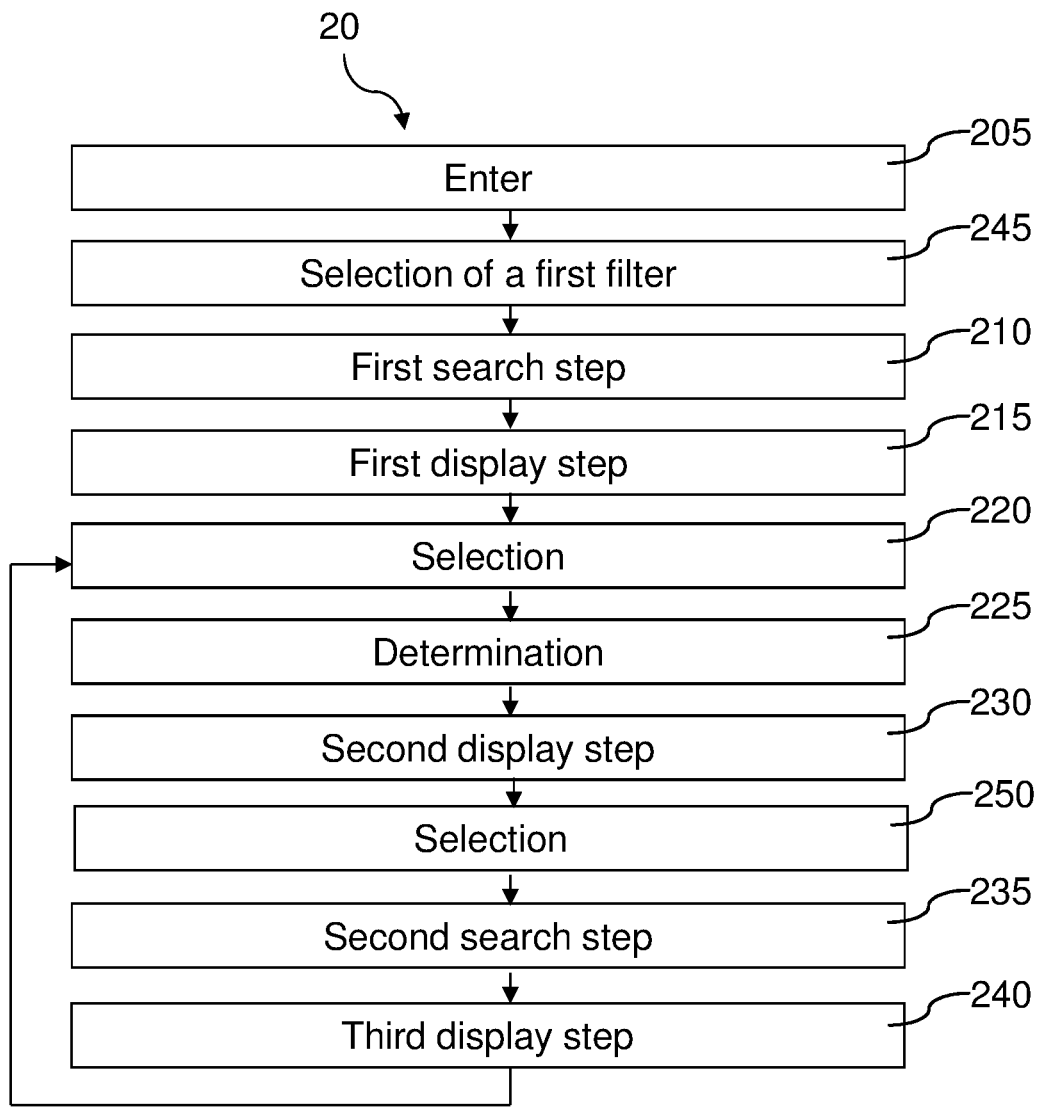
FIG. 2 represents, schematically, a second logical diagram of particular steps of the method that is the subject of the present invention.

FIG. 2 shows a logical diagram of particular steps of the method 20 that is the subject of the present invention. This method 20 for searching for pages accessible over a network comprises:
- a step 205 of entering at least one keyword in an input area displayed in a first portion of a page;
- a first step 210 of searching for resources, in a first database, on the basis of at least one entered keyword;
- a first step 215 of displaying, in a second portion of the displayed page, each result of the first search step and a mark associated with each result;

and at least one iteration of:
- a step 220 of selecting at least one mark;
- a step 225 of determining search filters, from a second database, on the basis of the mark selected;
- a second step 230 of displaying, in a third portion of the displayed page, information representative of each determined filter;
- a step 250 of selecting, by a user, at least one filter from the displayed filters;
- a second step 235 of searching for resources, in the first database of the network, on the basis of at least one entered keyword and each selected filter; and
- a third step 240 of displaying, in the second portion of the displayed page, the results of the second search.

The entry step 205 and search step 210 are similar to the entry step 105 and search step 110 described with regard to FIG. 1.

The first display step 215 is similar to the first display step 115 described with regard to FIG. 1, in which a mark is displayed opposite each displayed result from the first search.

The selection step 220 is carried out, for example, by the user utilizing a mouse to click on at least one mark.

The step 225 of determining filters is carried out, for example, by a calculation unit of the computer server configured to carry out a search in the second database on the basis of the mark selected. Each mark corresponds to at least one filter in the second database, each filter being entered automatically or manually with regard to a resource.

The second display step 230 is carried out, for example, by the circuit controlling the screen of the networked terminal configured to control the display, in the third portion of the page, of an item of information representative of each determined filter.

The selection step 250 is carried out, for example, by the user utilizing a mouse to click on at least one item of information representative of a determined filter, such as a button for example.

The second search step 235 is similar to the second search step 135 described with regard to FIG. 1.

The third display step 240 is similar to the third display step 140 described with regard to FIG. 1.

The difference between the embodiment as described with regard to FIG. 1 and the embodiment as described with regard to FIG. 2 is lies in the method of determining the filters. In the embodiment of FIG. 1, each filter is determined on the basis of results from the search, whereas in the embodiment of FIG. 2, each filter is determined on the basis of the user's selection of a mark.

In some embodiments, as described with regard to FIG. 2, the method 20 comprises, before the search step 210, a step 245 of selecting a first filter, from a list of predetermined first filters, each search step 210 or 235 being performed on the basis of at least one entered keyword and the selected first filter.

This selection step 245 is similar to the selection step 145 as described with regard to FIG. 1.

In some embodiments, the list of predetermined first filters is displayed in a fifth portion of the page, the step 245 of selecting a first filter being performed by a user selecting an item of information representative of said first filter in the list displayed.

Figure 3:
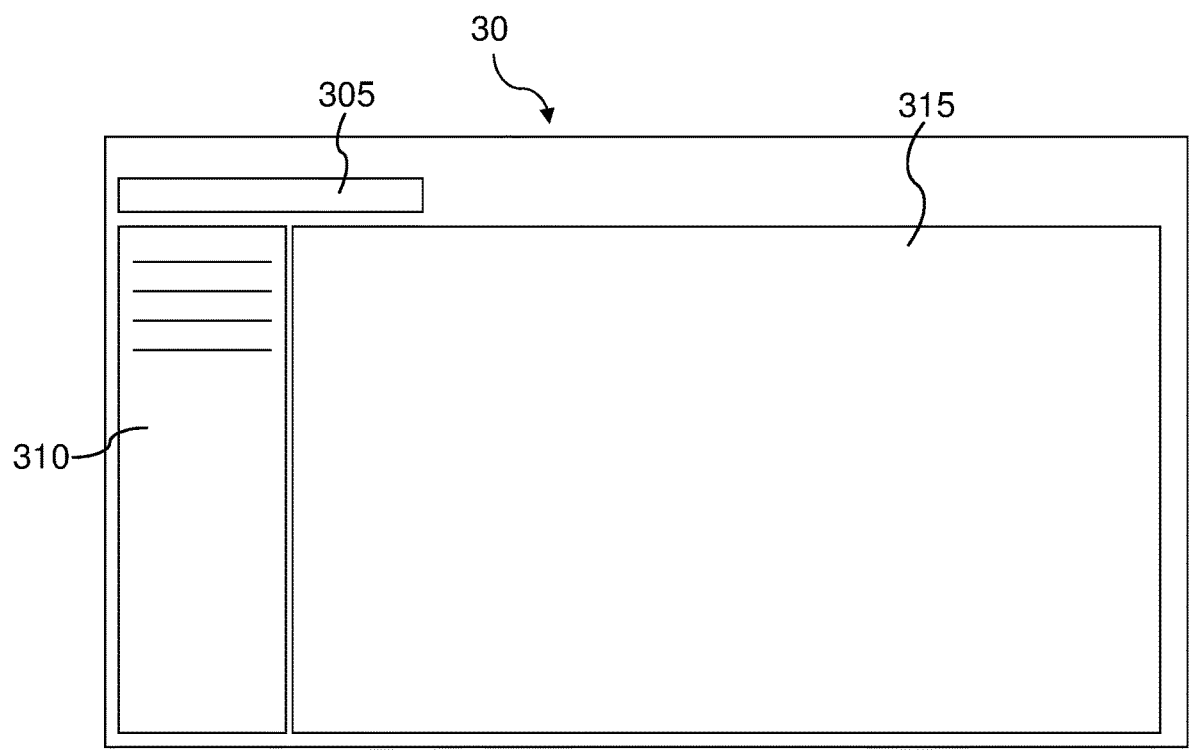
FIG. 3 represents, schematically, a first particular embodiment of an interface utilizing the method that is the subject of the present invention.

FIG. 3 shows, schematically, a particular embodiment of an interface 30 utilizing the method 10 or 20 that is the subject of the present invention.

In this interface 30, an input area 305 is displayed in the top left, this input area 305 enabling a user to enter search keywords.

This interface 30 also comprises a fifth display area 310 as described with regard to FIGS. 1 and 2, this fifth display area 310 comprising a plurality of first filters. These first filters correspond, for example, to categories of results looked for by the user, such as commercial offers, social network pages or pages containing information, for example. The user can select one or more of these first filters so as to orient the search carried out.

This interface 30 also comprises an area 315 for displaying information, customized or not, on the basis of a recorded user profile.

Figure 4:
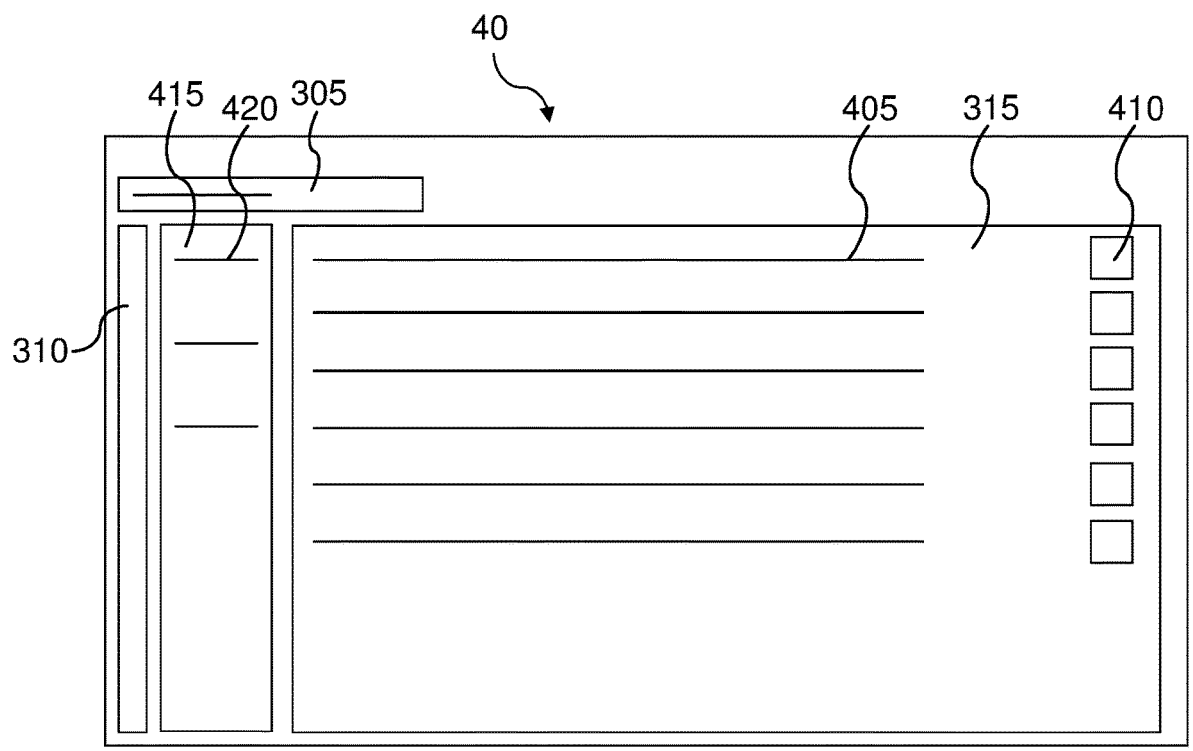
FIG. 4 represents, schematically, a second particular embodiment of an interface utilizing the method that is the subject of the present invention.

FIG. 4 shows, schematically, a particular embodiment of an interface 40 utilizing the method 10 or 20 that is the subject of the present invention.

This interface 40 corresponds to the interface 30 once a first search step has been carried out during the method 10 or 20.

In this interface 40, the fifth display area 310 is reduced or no longer displayed. A click on the reduced display area 310 causes this display area to be enlarged, as shown in FIG. 3.

In this interface, the display area 315 corresponds to the second display area of methods 10 and 20, a list of results 405 being displayed in a column. Each result 405 corresponds, for example, to a hyperlink to a page of a site. Opposite each result 405, a mark 410 is displayed, this mark 410 corresponding to the marks of the method 10 or the marks of the method 20.

This interface 40 also comprises a third area 415 for displaying determined filters 420. The determination of these filters is dependent on the method, 10 or 20, utilized.

Figure 5:
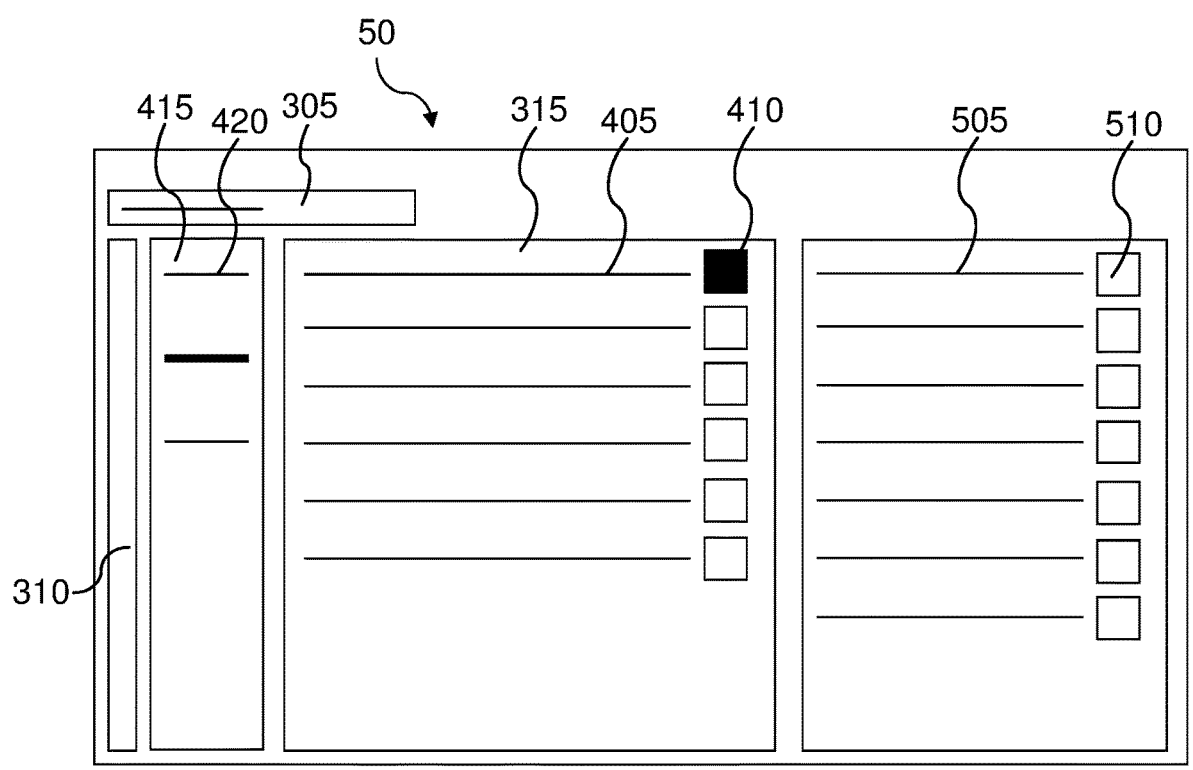
FIG. 5 represents, schematically, a third particular embodiment of an interface utilizing the method that is the subject of the present invention.

FIG. 5 shows, schematically, a particular embodiment of an interface 50 utilizing the method 10 or 20 that is the subject of the present invention.

This interface 50 corresponds to the interface 40 once a filter 420 has been selected during the method 10 or 20. The selection of a filter 420 can be carried out by:
- selecting a displayed filter 420 on the basis of displayed results 405;
- selecting a displayed filter 420 on the basis of a selected mark 410; and/or
- selecting a mark 410 corresponding tacitly to a filter 420, displayed or not.

In this interface 50, the display area 315 is divided into two portions, one portion corresponding to the results 405 from the first search and one portion corresponding to the results 505 from the second search. Opposite each result 505, a mark 510 is displayed. These marks 510 operate in a similar way to the marks 410.

In some variants, the display area 315 displays the results 505 from the second search instead of the results 405 from the first search, this display area 315 not therefore being divided into two portions.

In other variants, selecting a mark 510 or a filter 420 leads to the display in the first portion of the display area 315 of the results 505 and marks 510, and the display of the results from the new second search carried out and the marks associated with these results.

The invention claimed is:

1. Method for searching for pages accessible over a network, comprising:
a step of entering at least one keyword in an input area displayed in a first portion of a page;
a first step of searching for resources, in a first database, on the basis of at least one entered keyword;
a first step of displaying, in a second portion of the displayed page, the results of the first search step;
and at least one iteration of:
a step of determining filters by detecting keywords stored in a second database, and which are associated with the results provided after the first step of searching;
a second step of displaying, in a third portion of the displayed page, information representative of each determined filter and removing from said third portion filters determined during previous iterations;
a step of selecting, by a user, at least one filter from the displayed filters;
a second step of searching for resources, in the first database of the network, on the basis of at least one entered keyword and each selected filter without filters selected during previous iterations; and
a third step of displaying, in the second portion of the displayed page, the results of the second search.

2. Method according to claim 1, wherein a mark associated with each displayed result is displayed in the second portion of the displayed page, the step of selecting at least one filter being carried out by a user selecting at least one mark.

3. Method according to claim 2, which comprises the third step of displaying, in the third portion of the displayed page, results from the second search, in which at least one filter was selected by a user selecting a mark.

4. Method according to claim 2, wherein a mark associated with each displayed result is displayed in the second portion of the displayed page, the step of determining at least one filter being carried out on the basis of at least one mark selected by a user.

5. Method according to claim 2, wherein a filter is determined on the basis of a keyword when at least two resources are associated with said keyword.

6. Method according to claim 2, which comprises, before the search step, a step of selecting a first filter, from a list of predetermined first filters, each search step being performed on the basis of at least one entered keyword and the selected first filter.

7. Method for searching for pages accessible over a network, comprising:
a step of entering at least one keyword in an input area displayed in a first portion of a page;
a first step of searching for resources, in a first database, on the basis of at least one entered keyword;
a first step of displaying, in a second portion of the displayed page, each result of the first search step and a mark associated with each result;
and at least one iteration of:
a step of selecting at least one mark;
a step of determining search filters by detecting keywords stored in a second database, and which are associated with the mark selected;
a second step of displaying, in a third portion of the displayed page, information representative of each determined filter and removing from said third portion filters determined during previous iterations;
a step of selecting, by a user, at least one filter from the displayed filters;
a second step of searching for resources, in the first database of the network, on the basis of at least one entered keyword and each selected filter without filters selected during previous iterations; and
a third step of displaying, in the second portion of the displayed page, the results of the second search.

8. Method according to claim 7, which comprises, before the search step, a step of selecting a first filter, from a list of predetermined first filters, each search step being performed on the basis of at least one entered keyword and the selected first filter.

9. Method according to claim 8, wherein the list of predetermined first filters is displayed in a fifth portion of the page, the step of selecting a first filter being performed by a user selecting an item of information representative of said first filter in the list displayed.

* * * * *